(12) United States Patent
Jung et al.

(10) Patent No.: US 12,458,865 B2
(45) Date of Patent: Nov. 4, 2025

(54) EXERCISE ANALYSIS SYSTEM USING SENSOR WORN ON USER'S HEAD

(71) Applicant: BEFLEX INC., Daejeon-si (KR)

(72) Inventors: Chang Keun Jung, Daejeon-si (KR); Hyeob Choi, Daejeon-si (KR); Jin Kyuk Kim, Daejeon-si (KR)

(73) Assignee: BEFLEX INC., Daejeon-si (KR)

( * ) Notice: Subject to any disclaimer, the term of this patent is extended or adjusted under 35 U.S.C. 154(b) by 743 days.

(21) Appl. No.: 17/564,585

(22) Filed: Dec. 29, 2021

(65) Prior Publication Data

US 2022/0193522 A1   Jun. 23, 2022

Related U.S. Application Data

(63) Continuation-in-part of application No. PCT/KR2020/018910, filed on Dec. 22, 2020.

(30) Foreign Application Priority Data

Nov. 30, 2021   (KR) .................. 10-2021-0168790

(51) Int. Cl.
*A63B 69/16* (2006.01)
*A63B 33/00* (2006.01)
*A63B 71/06* (2006.01)

(52) U.S. Cl.
CPC .............. *A63B 71/06* (2013.01); *A63B 33/00* (2013.01); *A63B 69/16* (2013.01); *A63B 2071/0675* (2013.01); *A63B 2220/40* (2013.01); *A63B 2220/836* (2013.01); *A63B 2230/75* (2013.01); *A63B 2244/20* (2013.01)

(58) Field of Classification Search
CPC ......... A63B 71/06; A63B 33/00; A63B 69/16; A63B 2071/0675; A63B 2220/40; A63B 2220/836; A63B 2230/75; A63B 2244/20; G06F 18/24; G06F 2218/12; A61B 5/6814; A61B 5/1116
See application file for complete search history.

(56) References Cited

U.S. PATENT DOCUMENTS

| | | | |
|---|---|---|---|
| 2015/0272480 A1* | 10/2015 | Senta ...................... | G01P 15/18 600/595 |
| 2017/0074897 A1* | 3/2017 | Mermel ................. | A63B 69/16 |
| 2017/0343573 A1* | 11/2017 | Lai ........................... | G01V 7/02 |
| 2019/0053738 A1* | 2/2019 | Zhang ................... | A61B 5/1116 |
| 2021/0085248 A1* | 3/2021 | Coza ...................... | G16H 40/67 |

FOREIGN PATENT DOCUMENTS

JP         2016158780 A   *   9/2016

\* cited by examiner

*Primary Examiner* — Eyob Hagos
(74) *Attorney, Agent, or Firm* — Quantum Patent Law Firm; Seongyoune Kang

(57) ABSTRACT

The present invention relates to an exercise analysis system using a sensor worn on a user's head, and more specifically, to an exercise analysis system for measuring acceleration signals according to movement of a user's head using an accelerometer worn on the head, and separately analyzing exercise postures corresponding to the movement of the head by identifying user's left and right, front and rear, or up and down direction from the measured acceleration signals.

3 Claims, 15 Drawing Sheets

EXERCISE ANALYSIS SYSTEM USING SENSOR WORN ON USER'S HEAD

CROSS-REFERENCE TO RELATED APPLICATIONS

This patent application is a bypass continuation-in-part of International Application No. PCT/KR2020/018910, filed on Dec. 22, 2020, the entire contents of which are incorporated herein by reference. This application also claims priority to Korean Application No. 10-2021-0168790, filed on Nov. 30, 2021, the entire contents of which are incorporated herein by reference.

BACKGROUND OF THE INVENTION

Field of the Invention

The present invention relates to an exercise analysis system using a sensor worn on a user's head, and more specifically, to an exercise analysis system for measuring acceleration signals according to movement of a user's head using only an accelerometer worn on the head, and separately analyzing exercise postures corresponding to the movement of the head by identifying user's left and right, front and rear, or up and down direction from the measured acceleration signals.

Background of the Related Art

Recently, development of systems for analyzing human physical activities in daily life using various sensors is actively conducted. Postures among the human physical activities are known as natural movement that requires little cerebral functions, but in reality, it is proved to be related to high-level cognitive functions such as concentration, ability to act, and the like. As such, analysis of human postures is used as an important measure for evaluating whether a subject person is able to maintain normal daily life.

As the sensors related to analysis of human postures using only conventional accelerometers show the direction of gravitational acceleration, the up and down direction can be distinguished, but it is difficult to distinguish front and rear, and left and right directions of a person or a device. Therefore, in order to know the context of the front and rear, and left and right directions, a gyroscope is added in many cases.

However, since the gyroscope consumes much power, even mounting the gyroscope on a smartphone is a problem in the early days of smartphones. However, although the power consumption problem of the gyroscope has been partly resolved owing to increase in the size and battery capacity of the smartphones, mounting the gyroscope on a wearable device, earphones or the like is still in a situation difficult to solve due to the power consumption problem. In addition, since the wearable devices are limited particularly in increasing their sizes, it is anticipated that there will be certain limitations in the future in using the wearable devices for a long time while using the gyroscope.

Therefore, it is required to provide a technique capable of confirming exercise postures of a user by identifying user's up and down, left and right, or front and rear direction using only accelerometers. In addition, it needs to derive exercise parameters according to exercise postures and provide meaningful feedback.

The background technique of the present invention is prepared to further facilitate understanding of the present invention. It should not be understood as admitting that the matters described in the background technique of the present invention exist as prior art.

SUMMARY OF THE INVENTION

Therefore, the present invention has been made in view of the above problems, and it is an object of the present invention to provide an exercise analysis system for measuring acceleration signals according to movement of a user's head using only an accelerometer worn on the head, and separately analyzing exercise postures corresponding to the movement of the head by identifying user's left and right, front and rear, or up and down direction from the measured acceleration signals.

Particularly, an object of the present invention is to provide an exercise analysis system that can collect user's exercise acceleration in the up and down, front and rear, and left right directions using only an accelerometer mounted on the user's head while the user is doing a sports exercise such as swimming, mountaineering, cycling, or the like, classify exercise postures of each exercise, and derive exercise parameters.

To accomplish the above objects, according to one aspect of the present invention, there is provided an exercise analysis system comprising: a measurement module worn on a user's head to measure an acceleration signal according to movement of the head using an accelerometer; and an analysis module for calculating 3-axis directional axes by collecting a first acceleration corresponding to a viewpoint of a user gazing at the front and a second acceleration corresponding to a viewpoint of the user gazing at an angle other than the front, and analyzing exercise parameters for each exercise posture according to an exercise type by correcting the acceleration signal measured by the measurement module while the user is doing exercise into an acceleration signal of a user coordinate system.

In addition, the analysis module may include an exercise posture determination module for classifying exercise postures by determining whether a left-right direction acceleration ($x'$), a front-rear direction acceleration ($y'$), and an up-down direction acceleration ($z'$) corrected into the acceleration signal of the user coordinate system satisfy a preset condition.

When the exercise type is swimming, the preset condition may include a first condition for determining whether the front-rear direction acceleration is greater than a first reference value, a second condition for determining, when the first condition is not satisfied, whether a maximum value of the left-right direction acceleration is greater than the first reference value in a most recent preset time period based on a current time point, and a third condition for determining, when the second condition is not satisfied, whether, when frequencies of the front-rear direction acceleration and the up-down direction acceleration are analyzed, the accelerations are greater than a second reference value in a band greater than or equal to a preset frequency band.

At this point, the exercise posture determination module may determine the exercise posture as backstroke when the first condition is satisfied, freestyle when the second condition is satisfied, butterfly when the third condition is satisfied, and breaststroke when the third condition is not satisfied, and the second reference value may be smaller than the first reference value.

In addition, the analysis module may further include an exercise parameter extraction module for extracting exercise parameters for the exercise posture determined by the exercise posture determination module.

Here, the exercise parameters may include at least one among stroke count, stroke rate, stroke distance, turning time point, lap time, turning count, exercise distance, exercise speed, calorie consumption, and exercise efficiency (Swolf).

In addition, the exercise parameter extraction module may further extract at least one among vertical oscillation, horizontal oscillation, consistency, breathing time, left-right balance (symmetry), breathing volume, and shock amount on the basis of the extracted exercise parameters.

In addition, when the exercise type is mountaineering, the exercise posture determination module may determine the exercise posture as an ascending posture of the mountaineering exercise when an average value of the up-down direction acceleration measured in a most recent preset time period based on a current time point is greater than a preset value, and as a descending posture of the mountaineering exercise when the average value is smaller than or equal to the preset value.

In addition, the analysis module may further include an exercise parameter extraction module for extracting exercise parameters for the exercise posture determined by the exercise posture determination module, and at this point, the exercise parameters may include at least one among step count, step rate, shock amount, left-right balance (symmetry), consistency, horizontal oscillation, and maximum load.

In addition, the exercise parameter extraction module may further extract at least one among exercise distance, exercise speed, maximum exercise speed, lap time, step length, and calorie consumption on the basis of the extracted exercise parameters.

In addition, when the exercise type is cycling, the exercise posture determination module may determine the exercise posture as a standing posture of the cycling exercise when the vertical oscillation obtained by integrating twice the measured up-down direction acceleration is greater than a preset value, and as a sitting posture of the cycling exercise when the vertical oscillation is smaller than the preset value.

In addition, the analysis module may further include an exercise parameter extraction module for extracting exercise parameters for the exercise posture determined by the exercise posture determination module, and at this point, the exercise parameters may include at least one among stroke count, stroke rate, exercise speed, exercise distance, and calorie consumption.

In addition, the analysis module may include: an acceleration collection module for collecting a first acceleration corresponding to a viewpoint of the user gazing at the front and a second acceleration corresponding to a viewpoint of the user gazing at an angle other than the front from the measured acceleration signal; a gravity vector detection module for measuring a first gravity vector and a second gravity vector corresponding to the viewpoints at which the first acceleration and the second acceleration are collected, when indexes of variation of the first acceleration and the second acceleration satisfy a predetermined condition; and a direction axis calculation module for calculating a left-right direction vector and a front-rear direction vector by performing an outer product on the first gravity vector and the second gravity vector.

In addition, the analysis module may further include a calibration module for calculating a calibration matrix R on the basis of an up-down direction vector, i.e., the first gravity vector, the left-right direction vector, and the front-rear direction vector.

The calibration matrix may be calculated by the following equation using user coordinates of the user measured by the accelerometer and raw values of sensor coordinates.

$$X\text{cal} = R \times X\text{raw}$$

(Here, Xcal denotes sensor values (($u_x, u_y, u_z$), ($v_x, v_y, v_z$), ($w_x, w_y, w_z$)) of the user coordinates for an up-down axis, a left-right axis, and a front-rear axis, in which ($u_x, u_y, u_z$) is an up-down direction acceleration (z'), ($v_x, v_y, v_z$) is a left-right direction acceleration (x'), ($w_x, w_y, w_z$) is a front-rear direction acceleration (y'), and Xraw denotes raw values (x, y, z) of the sensor coordinates, in which R is a calibration matrix $$R = \begin{bmatrix} u_x & u_y & u_z \\ v_x & v_y & v_z \\ w_x & w_y & w_z \end{bmatrix}$$

configured based on the up-down direction vector (u), left-right direction vector (v), and front-rear direction vector (w).)

In addition, the direction axis calculation module may calculate a left-right direction vector of a left-right axis (ML, Medial-Lateral axis) by performing an outer product on the first gravity vector and the second gravity vector, and then calculate a front-rear direction vector of a front-rear axis (AP, Antero-Posterior axis) by performing an outer product on the first gravity vector and the left-right direction vector.

In addition, the direction axis calculation module may calculate the front-rear direction vector of the front-rear axis by performing an outer product on the first gravity vector and the second gravity vector, and then calculate the left-right direction vector of the left-right axis by performing an outer product on the first gravity vector and the front-rear direction vector.

Details of other embodiments are included in the detailed description and drawings.

The exercise analysis system of the present invention may classify exercise postures for each exercise and significantly improve accuracy of exercise analysis by analyzing acceleration signals of the left and right, up and down, and front and rear directions collected while a user is doing a sports exercise using only an accelerometer worn on the head.

Particularly, the exercise analysis system of the present invention may accurately classify user's sports exercises (e.g., swimming, mountaineering, cycling) and exercise postures (strokes of swimming exercise, ascending or descending of mountaineering exercise, and sitting or standing of cycling exercise) by correcting accelerations collected from an accelerometer worn on the user's head into user's coordinates and analyzing the accelerations.

In addition, the exercise analysis system of the present invention may provide meaningful feedback on the user's exercise by extracting exercise parameters of each exercise for correcting exercise or confirming an exercise state on the basis of the collected accelerations.

The effect according to the present invention is not limited by the contents exemplified above, and further various effects are included in this specification.

DETAILED DESCRIPTION OF THE PREFERRED EMBODIMENT

Hereinafter, only the principles of the present invention will be exemplified. Therefore, although not clearly described or shown in this specification, those skilled in the art will be able to implement the principles of the present invention and invent various devices included in the spirit and scope of the present invention. In addition, it should be understood that all conditional terms and embodiments listed in this specification are, in principle, clearly intended only for the purpose of understanding the concept of present invention, and not limited to the embodiments and states specially listed as such.

In addition, it should be understood that in the following description, ordinal expressions such as first, second, and the like are for describing objects that are equivalent to and independent from each other, and main/sub or master/slave in the order is meaningless.

The above objects, features and advantages will become more apparent through the following detailed description in relation to the accompanying drawings, and accordingly, those skilled in the art will be able to easily embody the technical spirit of the present invention.

Each feature of various embodiments of the present invention may be partially or wholly coupled to or combined with each other, and as those skilled in the art will fully understand, technically various interconnections and drives are possible, and the embodiments may be implemented to be independent from each other, or may be implemented together in a related relationship.

Hereinafter, various embodiments of the present invention will be described in detail with reference to the accompanying drawings.

Figure 1:
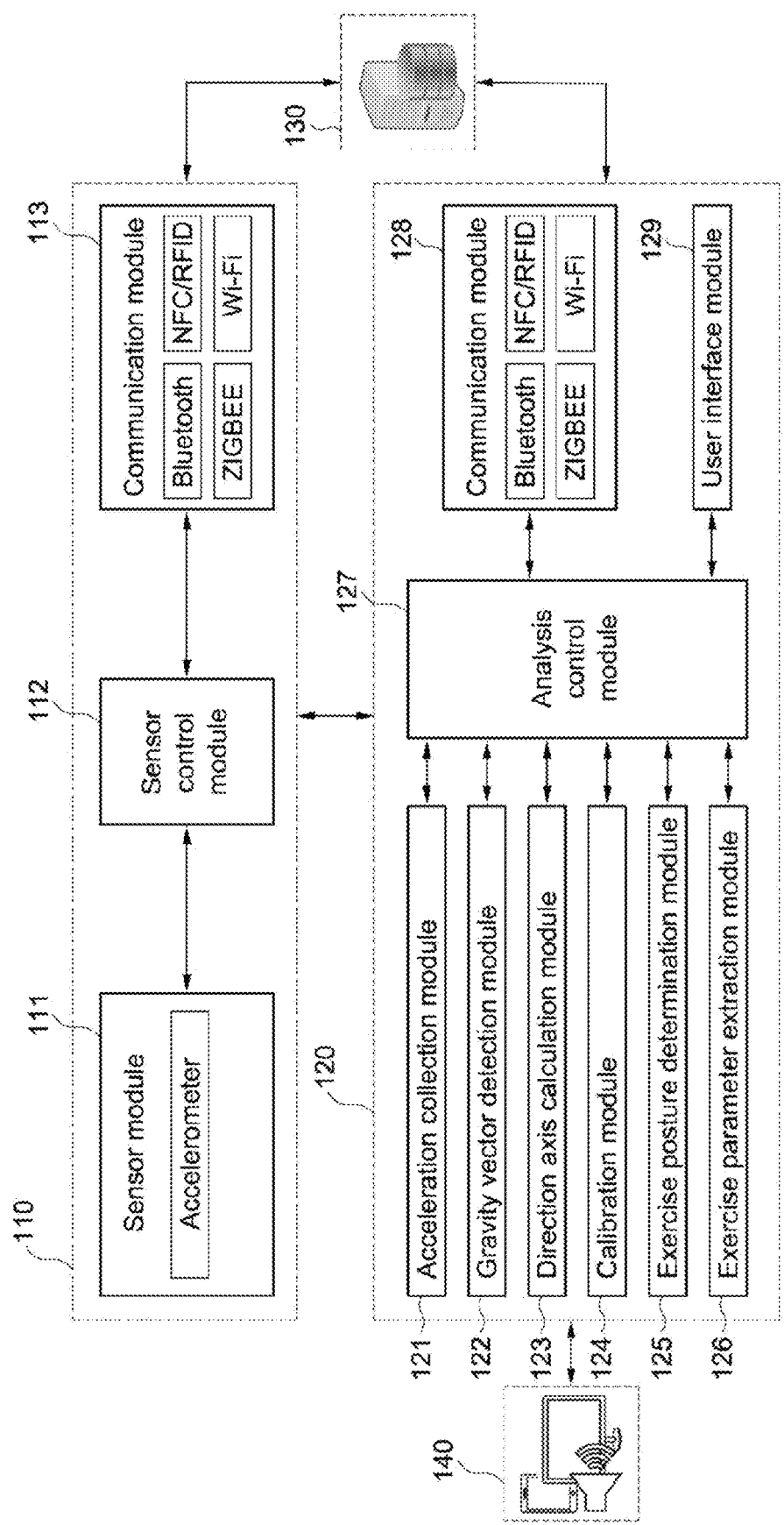
FIG. 1 is a view schematically showing the configuration of an exercise analysis system according to an embodiment of the present invention.
Figure 2:
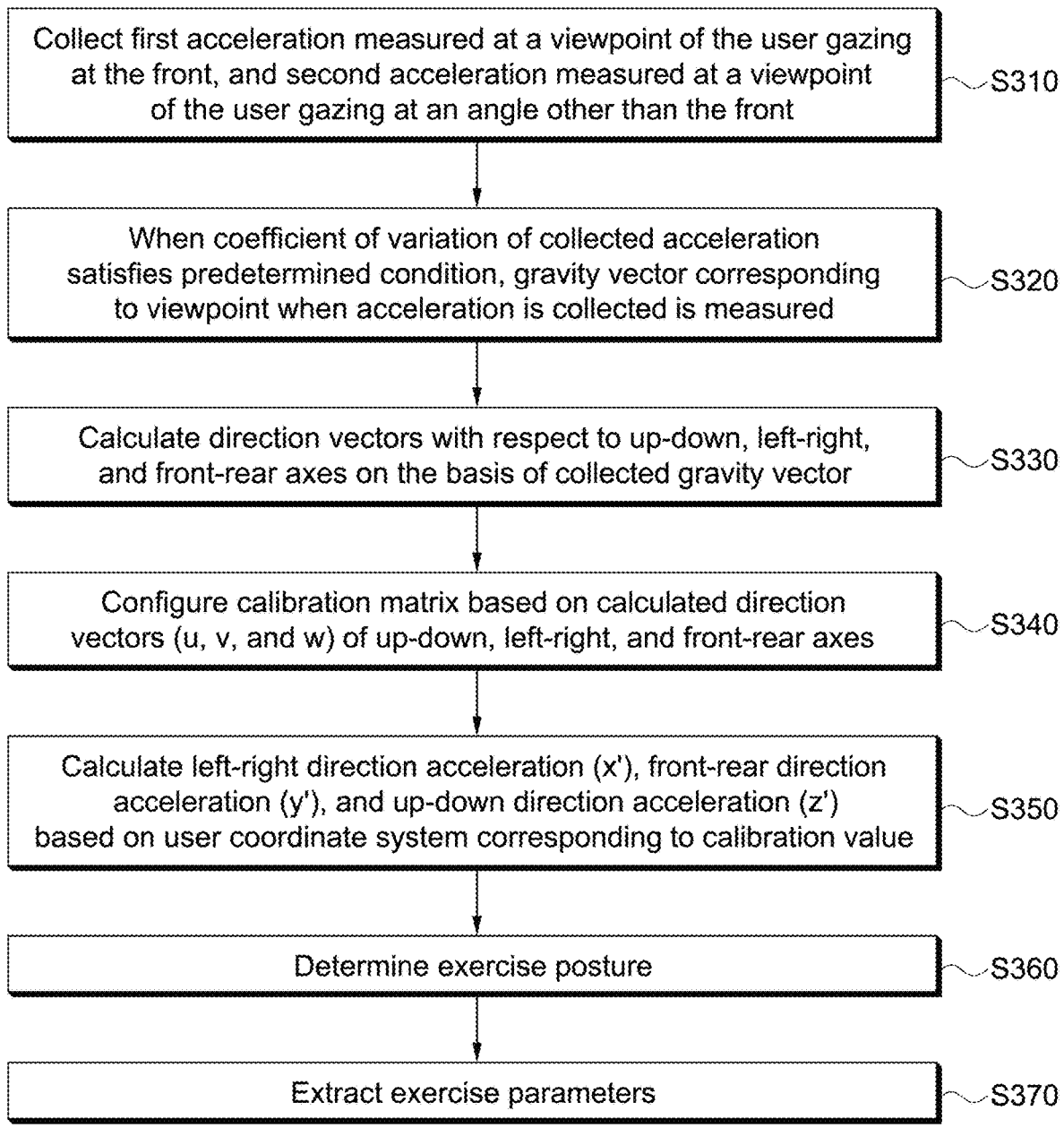
FIG. 2 is a flowchart illustrating an exercise analysis method according to an embodiment of the present invention.

FIG. 1 is a view schematically showing the configuration of an exercise analysis system according to an embodiment of the present invention. FIG. 2 is a flowchart illustrating an exercise analysis method according to an embodiment of the present invention. The configuration of an exercise analysis system and an exercise analysis method according to an embodiment of the present invention will be described with reference to FIGS. 1 and 2.

Referring to FIG. 1, the exercise analysis system according to an embodiment of the present invention may provide a user with meaningful feedback such as exercise information, posture information, risk information, a guide for posture correction, and the like by analyzing exercise postures and deriving exercise parameters while doing a sports exercise using only an accelerometer mounted on the user's head.

Particularly, the exercise analysis system of the present invention may collect user's exercise acceleration in the up and down, front and rear, and left right directions using only an accelerometer mounted on the user's head while the user is doing a sports exercise such as swimming, mountaineering, cycling, or the like, classify exercise postures of each exercise, and derive exercise parameters.

To this end, the exercise analysis system according to an embodiment of the present invention may include a measurement module 110, an analysis module 120, a database 130, and a guide module 140. At this point, the exercise analysis system is configured as an integrated form worn on the user's ears in the form of earphones, or alternatively, only the measurement module 110 is implemented in a form worn on the user's ears in the form of earphones, and the analysis module 120, the database 130, and the guide module 140 may be implemented as a separate server or app. At this point, the exercise analysis system is not limited to the earphone type and may be attached near the ears or the head using a band or various devices.

The measurement module 110 measures acceleration signals using an accelerometer worn on the user's head, and may include a sensor module 111, a sensor control module 112, and a communication module 113 as shown in FIG. 1.

The sensor module 111 may measure sensor values needed for exercise posture analysis of the analysis module 120 and transmit the measured values to the analysis module 120. In this case, in order to determine the front and rear, and left and right directions as a criterion for analyzing the sensor values, the sensor module 111 may measure a sensing value sensing an acceleration when the user gazes at the front (hereinafter, referred to as a first acceleration) and a sensing value sensing an acceleration when the user gazes at an angle other than the front (hereinafter, referred to as a second acceleration).

In addition, the sensor module 111 of the present invention collects sensor values using only an accelerometer without a gyroscope. A specific measurement method related thereto will be described below.

The sensor control module 112 may control the overall operation of the measurement module 110.

The communication module 113 may transmit sensor values sensed by the sensor module 111 to the analysis module 120. For example, the communication module 113 may include Bluetooth, Near Field Communication (NFC), Radio-Frequency Identification (RFID), a Zigbee module, Wi-Fi, and the like.

The analysis module 120 is a module that receives the sensed sensing values from the measurement module 110 and analyzes exercise postures and exercise parameters while the user is doing a sports exercise based on the received sensing values.

Referring to FIG. 1, the analysis module 120 includes an acceleration collection module 121, a gravity vector detection module 122, a direction axis calculation module 123, a calibration module 124, an exercise posture determination module 125, an exercise parameter extraction module 126, an analysis control module 127, a communication module 128, and a user interface module 129. Here, the analysis control module 125 may control the overall operation by controlling each component of the posture analysis module 120 described above.

The acceleration collection module 121 receives the sensed acceleration signals from the sensor module 111. For example, the acceleration collection module 121 receives accelerations of the x-axis, y-axis, and z-axis of the accelerometer itself sensed by the accelerometer. However, when there is no movement of the accelerometer at all, the acceleration collection module 121 outputs accelerations of the x-axis, y-axis, and z-axis corresponding to the gravitational acceleration by default.

In this case, in order to determine the front and rear, and left and right directions as a criterion for analyzing the sensor values, accelerations measured when the user looks at different points of view may be collected. Here, the different points of view may be defined by a viewpoint of the user gazing at the front and a viewpoint of the user gazing at an angle other than the front.

Figure 3:
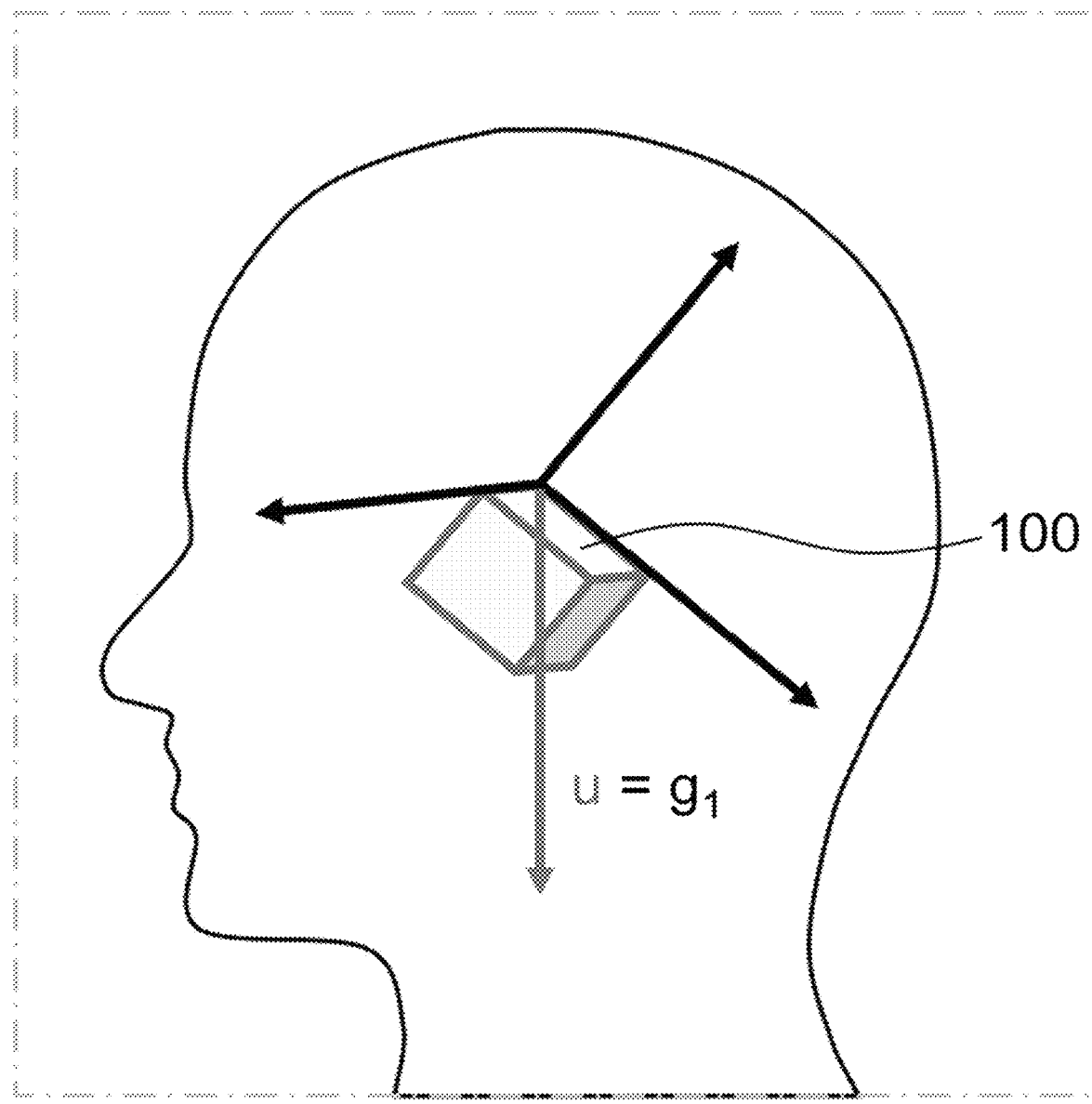
FIG. 3 is an exemplary view showing a case in which a user using an exercise analysis system according to an embodiment of the present invention gazes at the front.

At this point, the viewpoint gazing at the front means, for example, a direction when the user looks at a direction recognized as the front as shown in FIG. 3. For example, the viewpoint of the user gazing at the front may mean a viewpoint of the user gazing (a state in which there is no user's movement for a while) in a direction recognized as the front (e.g., the direction in which the gaze direction and the ground are parallel) within a predetermined time period when a guide phrase is output from the earphones.

Figure 4:
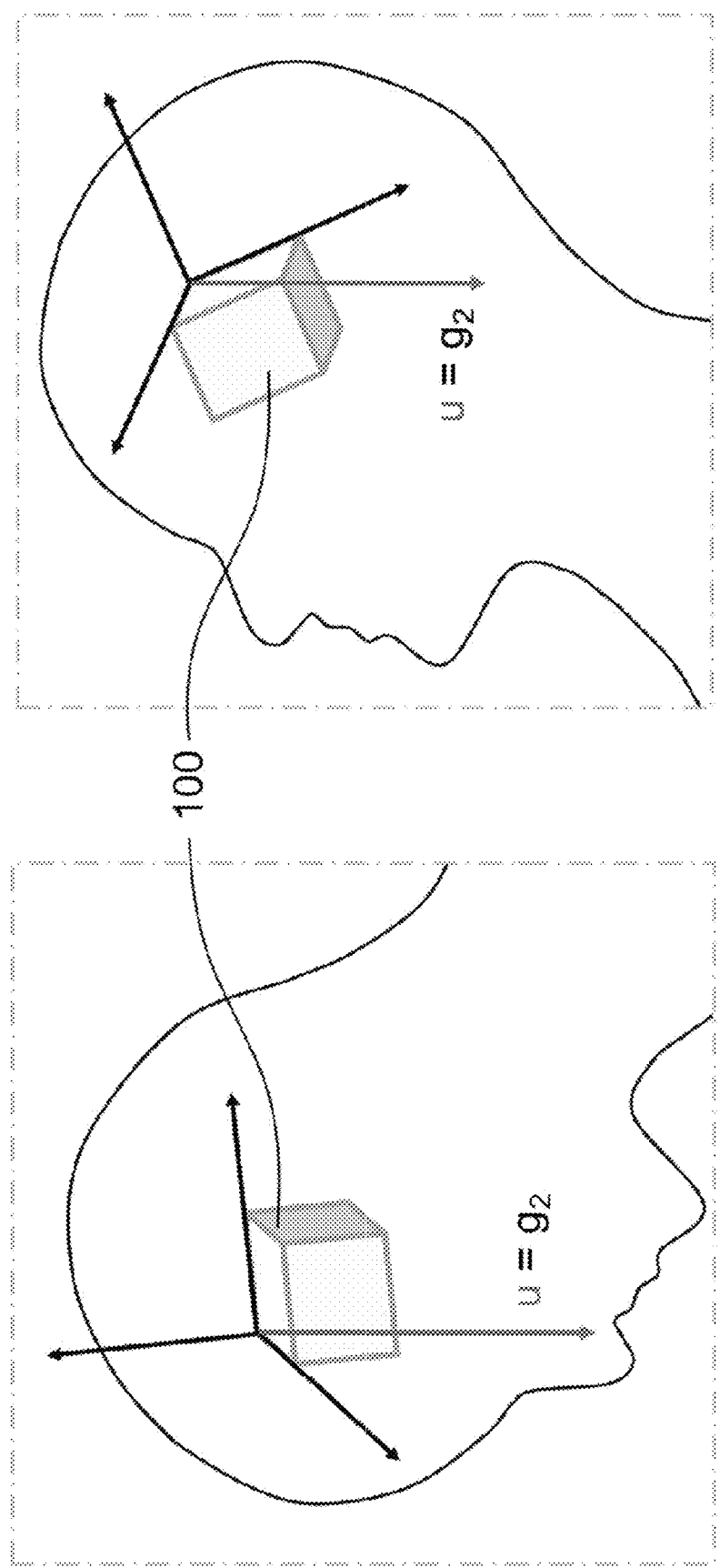
FIG. 4 is an exemplary view showing a case in which a user using an exercise analysis system according to an embodiment of the present invention gazes at an angle other than the front.

On the other hand, the viewpoint of the user gazing at an angle other than the front may mean, for example, a viewpoint at which the user's line of sight is directed downward or upward by about 45° while the head is tilted forward or backward according to the guide phrase output through the earphones when the user moves in a direction different from the front direction according to the guide phrase output through the earphones as shown in FIG. 4.

Specifically, for example, the angle other than the front may include an angle rotated with respect to any one axis among the axes of the up and down direction, the left and right direction, and the front and rear direction.

Accordingly, in order to determine the front and rear direction or the left and right direction, the acceleration collection module 121 may collect a first acceleration measured at the viewpoint of the user gazing at the front, and a second acceleration measured at the viewpoint gazing at an angle other than the front (S310).

In addition, the acceleration collection module 121 may collect the first and second accelerations more accurately from the user by using a guide voice or a guide screen that outputs a voice or visual signal so that the user may stand still while gazing at a specific area. For example, the guide voice may be used when an accelerometer is mounted on the earphones, and the guide screen may be used when the user wears the accelerometer on the head through a system such as smart glasses.

When the index of variation of the acceleration collected for several seconds by the acceleration collection module 122 meets a predetermined condition, the gravity vector detection module 122 may measure a gravity vector corresponding to the viewpoint at which the acceleration is collected (S320).

Here, the index of variation of acceleration indicates a degree of change in the acceleration according to user's movement, and various indices such as a coefficient of variation or a maximum displacement during a predetermined time period may be used. In this embodiment, the coefficient of variation is used as the index of variation. Meanwhile, in addition to the coefficient of variation, when the sensed acceleration value is a value that may indicate whether the user is looking in a predetermined direction with an intention, it can be used as an index of variation.

For example, when the coefficient of variation of the acceleration is less than 2% under a predetermined condition, it is determined that the error rate of the acceleration is low, and gravity vector measurement is performed. However, when the index of variation of acceleration is, for example, greater than a reference value, it is determined that the user does not intend to look in a specific direction, but the error rate of the acceleration is high, and it may be defined as a condition that is set to perform gravity vector measurement after measuring again the acceleration.

Accordingly, when the index of variation of the acceleration is equal to or greater than the reference value, it is preferable to measure a gravity vector corresponding to each viewpoint after measuring the first acceleration and/or the second acceleration again according to the viewpoints different from each other.

Referring to FIGS. 3 and 4, the gravity vector detection module 122 may measure a first gravity vector g1 and a second gravity vector g2, and transmit the measured values to the direction axis calculation module 123.

The direction axis calculation module 123 may receive the gravity vectors g1 and g2 from the gravity vector detection module 122, and detect the direction vectors with respect to three axes on the basis of the gravity vectors g1 and g2 (S330). Here, the three axes include an up-down axis SI, a left-right axis ML, and a front-rear axis AP.

Specifically, referring to FIG. 4, the up-down axis SI is an up-down direction vector u, and may be defined as the first gravity vector g1 collected in FIG. 3.

Figure 5:
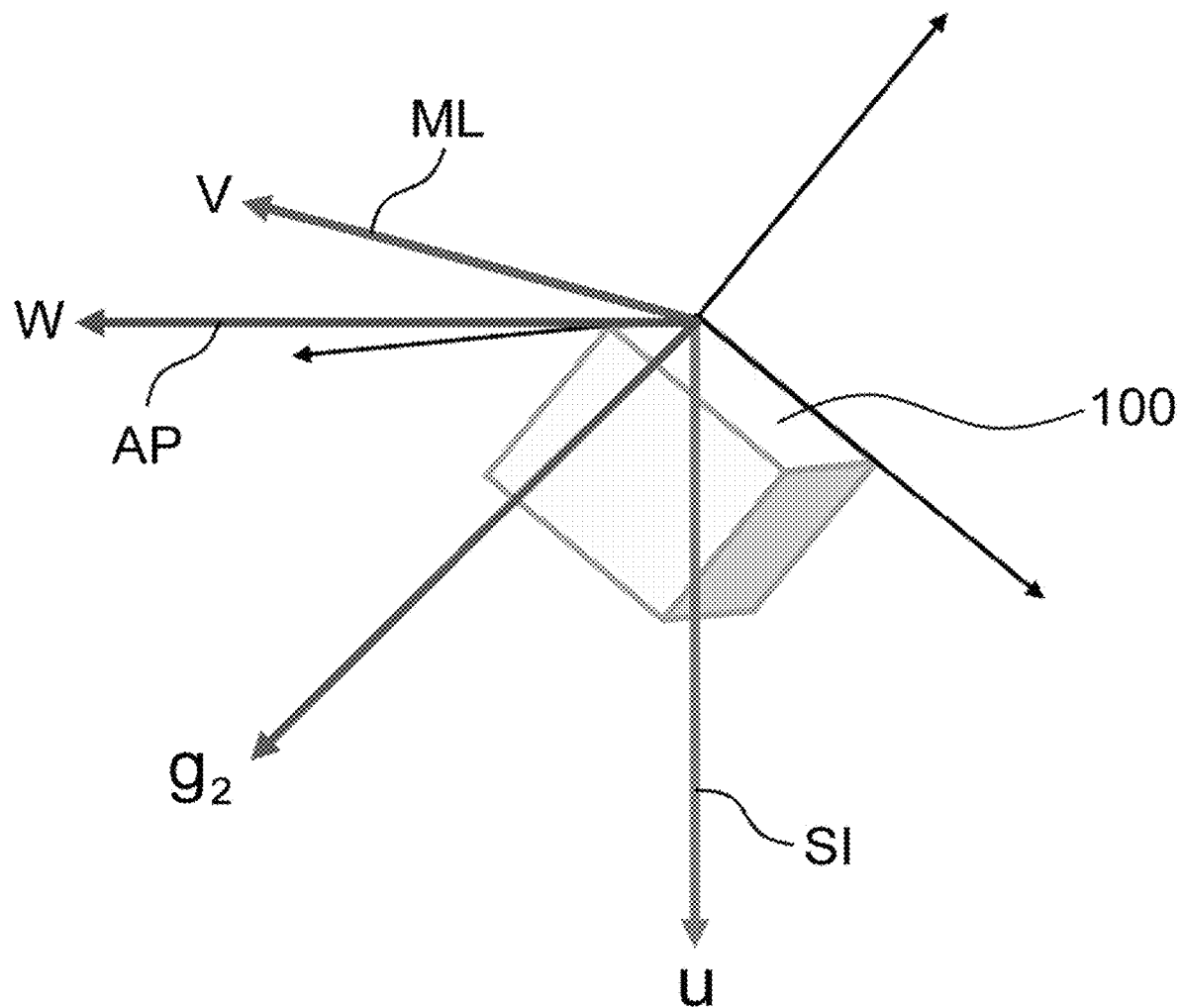
FIG. 5 is an exemplary view for explaining an axis setting process according to an exercise analysis system according to an embodiment of the present invention.

In addition, the left-right axis ML is a left-right direction vector v, and may be defined as a value obtained by performing an outer product on the first gravity vector g1 ('u' in FIG. 5) and the second gravity vector g2. For example, the left-right direction vector v may be calculated by Equation 1 shown below.

$$v = g1 \times g2 = u \times g2 \quad \text{(Equation 1)}$$

In addition, the front-rear axis AP is a front-rear direction vector w, and may be defined as a value obtained by performing an outer product on the up-down direction vector u and the left-right direction vector v. For example, the front-rear direction vector w may be calculated by Equation 2 shown below.

$$w = g1 \times (g1 \times g2) = u \times v \quad \text{(Equation 2)}$$

As described above, according to an embodiment of the present invention, it is essential to calculate the left-right direction vector v using the up-down direction vector u, and then calculate the front-rear direction vector w using the up-down direction vector u and the left-right direction vector v.

However, since the process described above is a process based on a case in which a user gazes at the front, when the user gazes at an angle other than the front, the front-rear direction vector w is calculated first using the up-down direction vector u, and then the left-right direction vector v may be calculated later. That is, after the front-rear direction vector of the front-rear axis is calculated by performing an outer product on the first gravity vector and the second gravity vector, the left-right direction vector of the left-right axis may be calculated by performing an outer product on the first gravity vector and the front-rear direction vector.

The calibration module 124 configures a calibration matrix based on the direction vectors u, v, and w of the up-down, left-right, and front-rear axes (SI, ML, AP) calculated by the direction axis calculation module 123, and calculates a calibration value (S340).

Figure 6:
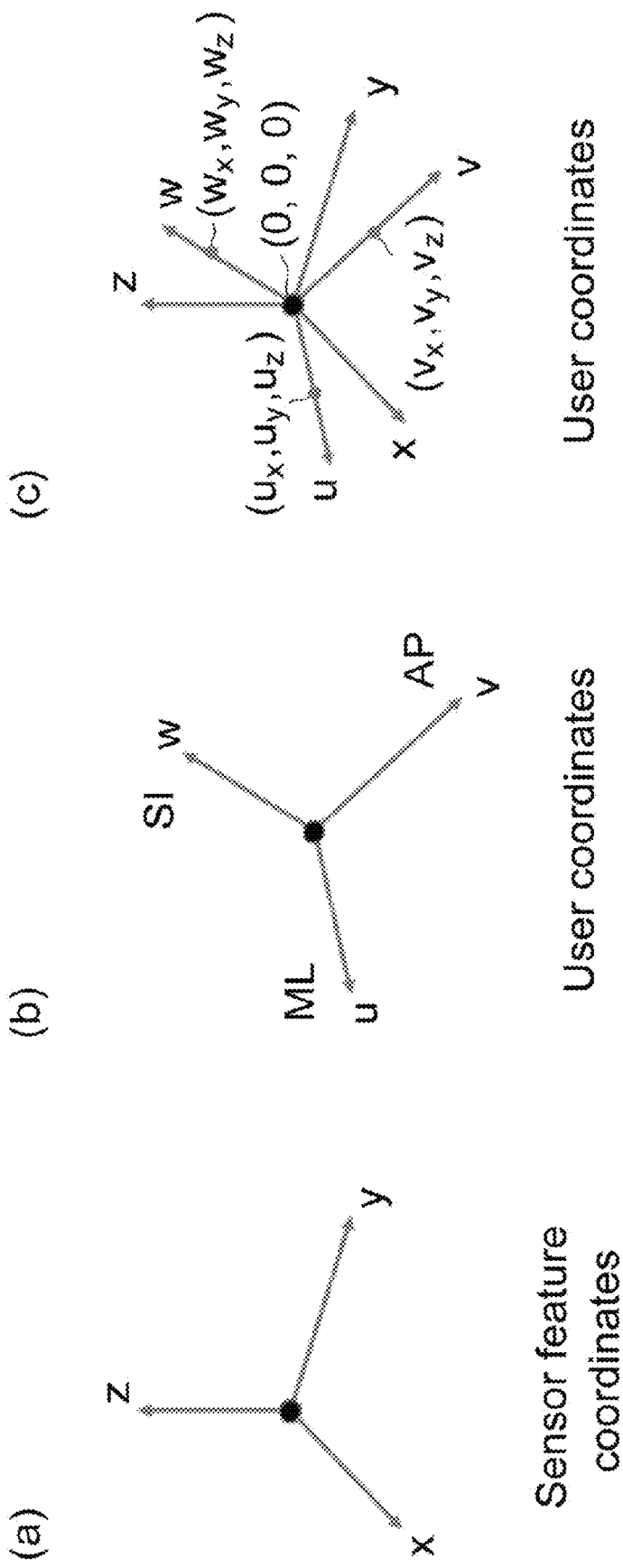
FIG. 6 is an exemplary view for explaining a process of constructing and calculating a calibration matrix after an axis correction process according to an embodiment of the present invention.

Referring to FIG. 6, the calibration module 124 may calculate a calibration matrix R using sensor values Xcal of user coordinates and raw values Xraw of sensor coordinates. As shown in (c) of FIG. 6, the calibration matrix R is calculated using user coordinates $(u_x, u_y, u_z)$, $(v_x, v_y, v_z)$, and $(w_x, w_y, w_z)$. At this point, the calibration matrix R may be calculated by Equation 3 shown below.

$$X\text{cal} = R \times X\text{raw} \quad \text{(Equation 3)}$$

Here, $$R = \begin{bmatrix} u_x & u_y & u_z \\ v_x & v_y & v_z \\ w_x & w_y & w_z \end{bmatrix}.$$

However, a 4*4 matrix (e.g., $$R = \begin{bmatrix} u_x & u_y & u_z & 0 \\ v_x & v_y & v_z & 0 \\ w_x & w_y & w_z & 0 \\ 0 & 0 & 0 & 1 \end{bmatrix})$$

may be used depending on the type of data supported by the accelerometer or the type of operation supported by a matrix processing operation chip. Accordingly, the calibration calculation module 124 converts the sensor's own coordinate system into a user-oriented coordinate system using the calibration matrix.

Owing to the conversion into the user-oriented coordinate system, various analyses, which are difficult in the prior art, such as calculation of shock applied to the human body during exercise, correction of exercise postures (e.g., while exercising in an asymmetrical state of right and left sides) and the like, may be performed based on the information measured by the accelerometer without using information measured by a gyroscope.

Particularly, in the conventional techniques, it is very difficult for the wearable devices such as earphones and watches to measure precise exercise postures since the gyroscope consumes much power when measuring postures, and although they are used, it is difficult to endure the power consumption with the small battery capacity of the wearable devices. However, according to the present invention, precise calculation of exercise postures may be performed using only the information based on the accelerometer.

Figure 7:
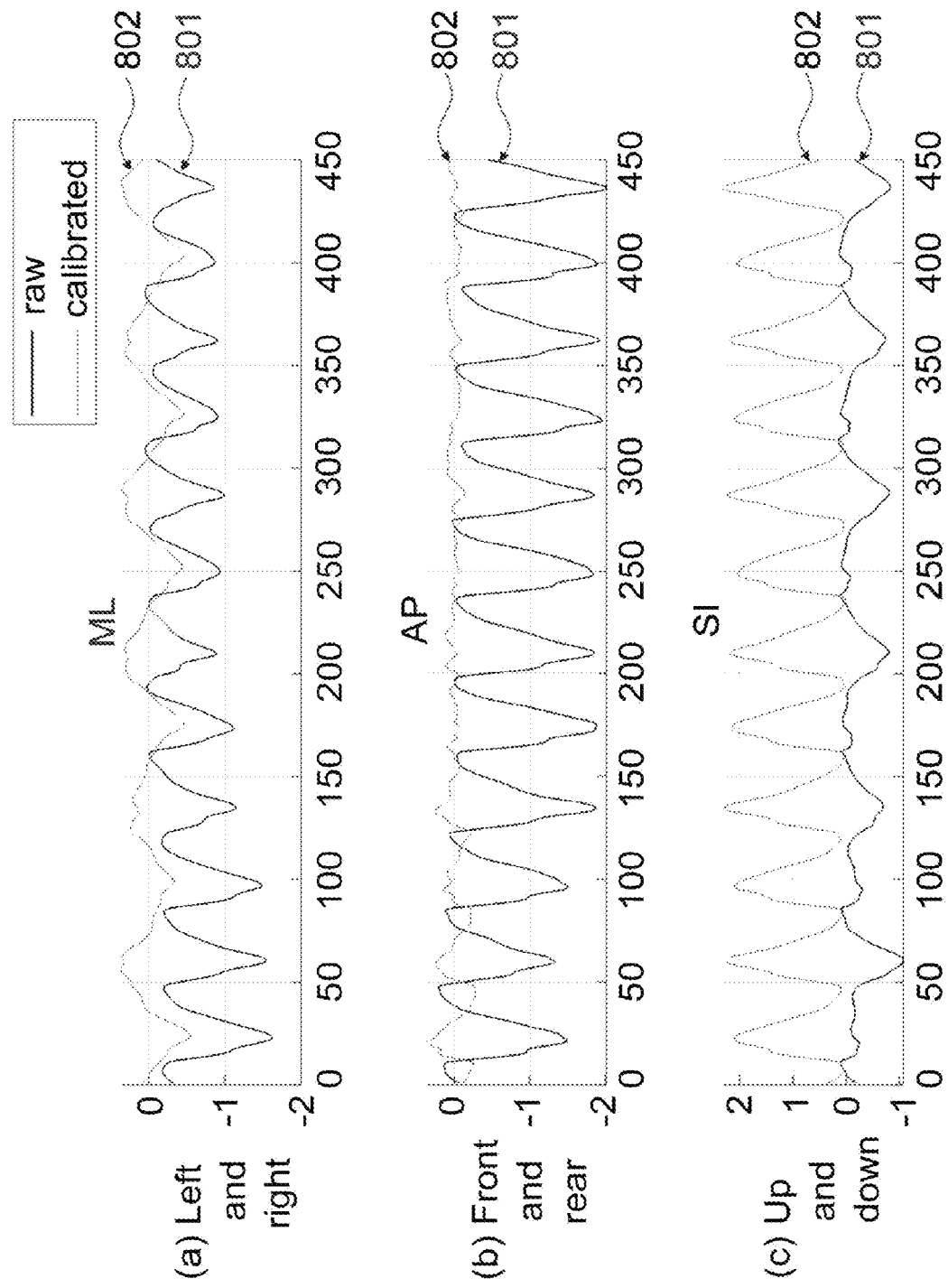
FIG. 7 is a graph showing calibration values with respect to time according to a direction axis according to an embodiment of the present invention.

When the calibration matrix R is determined by the process described above, sensor values (Xcal) 802 of the user coordinates for the up-down, left-right, and front-rear axes (SI, ML, AP) may be calculated based on the raw values (Xraw) 801 of the sensor coordinates as shown in FIG. 7. That is, the calibration module 124 may calculate left-right direction acceleration (x'), front-rear direction acceleration (y'), and up-down direction acceleration (z') based on a user coordinate system corresponding to the calibration value (S350).

Specifically, the acceleration signal 801 with respect to time (ms) is collected by using the exercise analysis system worn on the user's ears. At this point, the acceleration signal 801 may be an up-down direction acceleration, a left-right direction acceleration, or a front-rear direction acceleration. At this point, each of the collected acceleration signals 801 may be set as a norm of the up-down axis AI, left-right axis ML, and front-rear axis AP signals.

The analysis module 120 may correct the accelerometer values collected from the measurement module 110 while the user is doing a sports exercise into the user coordinate system using the calibration matrix R, and classify exercise postures by determining whether the left-right direction acceleration (x'), front-rear direction acceleration (y'), and up-down direction acceleration (z') satisfy a preset condition through the analysis control module 125.

At this point, while the user is doing a sports exercise, the exercise type may be input through the user interface module 129, or a corresponding exercise type may be determined by comparing the pattern of the collected accelerations with an acceleration pattern previously stored for each exercise, or the exercise type may be determined from whether the collected accelerometer value satisfies a preset condition.

In the present invention, swimming, mountaineering, and cycling may be described as examples of sports exercise using an accelerometer value, and it is possible to classify exercise postures and derive exercise parameters for each sport exercise by determining whether a preset condition is satisfied.

For example, when the sports exercise is swimming, the exercise posture determination module 125 may classify the strokes of backstroke, freestyle, butterfly, and breaststroke through determination of conditions, and it may be described with reference to FIG. 8.

Figure 8:
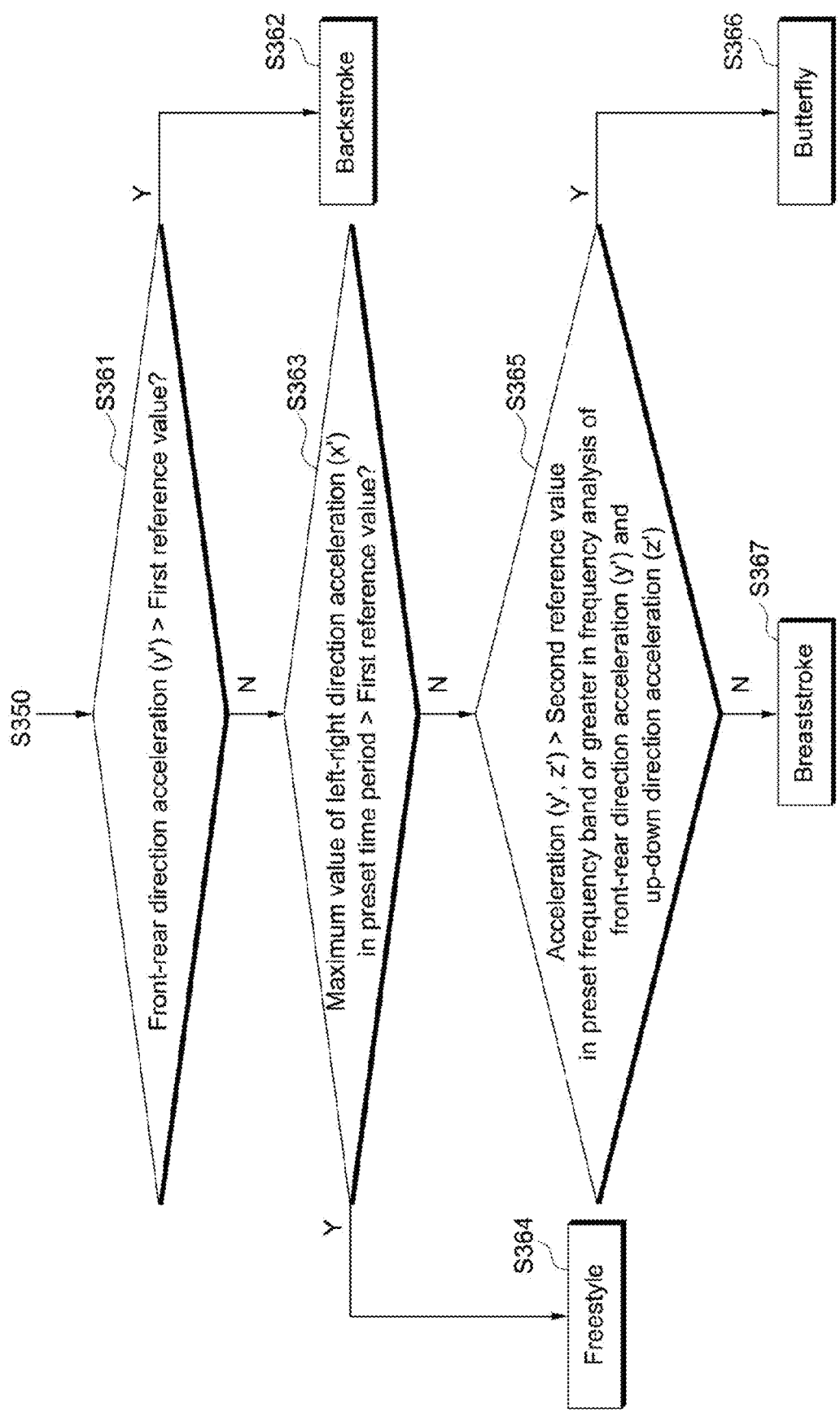
FIG. 8 is a flowchart illustrating an embodiment of determining the exercise posture of FIG. 2.

FIG. 8 is a flowchart illustrating an embodiment of determining the exercise posture of FIG. 2. Referring to FIG. 8, the exercise posture determination module 125 may analyze the acceleration collected when the user swims by using the left-right direction acceleration (x'), front-rear direction acceleration (y'), and up-down direction acceleration (z') converted through the calibration matrix R.

That is, when the left-right direction acceleration (x'), front-rear direction acceleration (y'), and up-down direction acceleration (z') calculated at step S350 are input, a first condition of whether the front-rear direction acceleration (y') is greater than the first reference value is determined (S361). Here, when the first condition is determined, a first reference value may be determined based on the fact that the gravity and the gaze direction (i.e., the front-rear direction of the user) coincide as the user takes a posture of lying during backstroke. Considering this, the first reference value may be 0.5 g (g is the acceleration of gravity), and may be variably applied according to the determination.

Here, when the first condition is satisfied, it can be classified as backstroke (S362). On the other hand, when the first condition is not satisfied, a second condition of whether the maximum value of the left-right direction acceleration (x') is greater than the first reference value in the most recent preset time period based on the current time point is determined (S363).

Here, when the second condition is determined, the reference value may be determined based on the fact that the user moves in a direction the same as the direction of gravity as the user moves the head in the left and right direction of the user to breathe during the freestyle. Considering this, when the second condition is determined, the reference value may be 0.5 g like the first reference value, and the reference value may be variably applied according to determination of the reference value, or a value different from the first reference value may be applied.

At this point, when the second condition is satisfied, it can be classified as freestyle (S364). On the other hand, when the second condition is not satisfied, a third condition of whether, when the frequencies of the front-rear direction acceleration (y') and the up-down direction acceleration (z') are analyzed, the accelerations have a component of which the magnitude is greater than a second reference value in a band greater than a preset frequency band is determined (S365). Here, the preset frequency band may be 0.5 Hz, and the second reference value may be 0.25 g, and the second reference value may be determined based on the magnitude of movement during the butterfly and breaststroke.

That is, a frequency response graph may be derived by performing Fourier transform on the front-rear direction acceleration (y') and the up-down direction acceleration (z'), and whether there is a component greater than 0.25 g in a frequency band of 0.5 Hz or higher is determined. At this point, when the third condition is satisfied, it is determined as butterfly (S366), and when the third condition is not satisfied, it is determined as breaststroke (S376).

For example, conditions such as the first reference value, the second reference value, and the preset frequency band may be obtained from the accelerations obtained by repeatedly performing swimming for each stroke using the exercise analysis system according to an embodiment of the present invention, and an exercise posture classification model for distinguishing the strokes may be modeled using the acceleration signals obtained by repeatedly performing swimming for each stroke as learning data, and the exercise posture analysis module 125 according to an embodiment of the present invention may classify the strokes using the acceleration signals collected when a user swims on the basis of the exercise posture classification model. On the other hand, the same method may be used for classification of exercise postures in mountaineering and cycling.

In addition, the exercise parameter extraction module 126 according to an embodiment of the present invention may derive and provide exercise parameters for the exercise postures determined by the exercise posture analysis module 125 from the left-right direction acceleration (x'), front-rear direction acceleration (y'), and up-down direction acceleration (z') collected over time.

When the exercise type is swimming, the exercise parameter extraction module 126 may derive and provide at least one exercise parameter among the stroke count, stroke rate, stroke distance, turning time point, lap time, turning count, exercise distance, exercise speed, calorie consumption, and exercise efficiency (Swolf) for each stroke.

At this point, FIGS. 9 to 12 may explain the exercise parameters extracted for each stroke from the examples of an acceleration graph according to an exercise posture of each swimming stroke.

Figure 9:
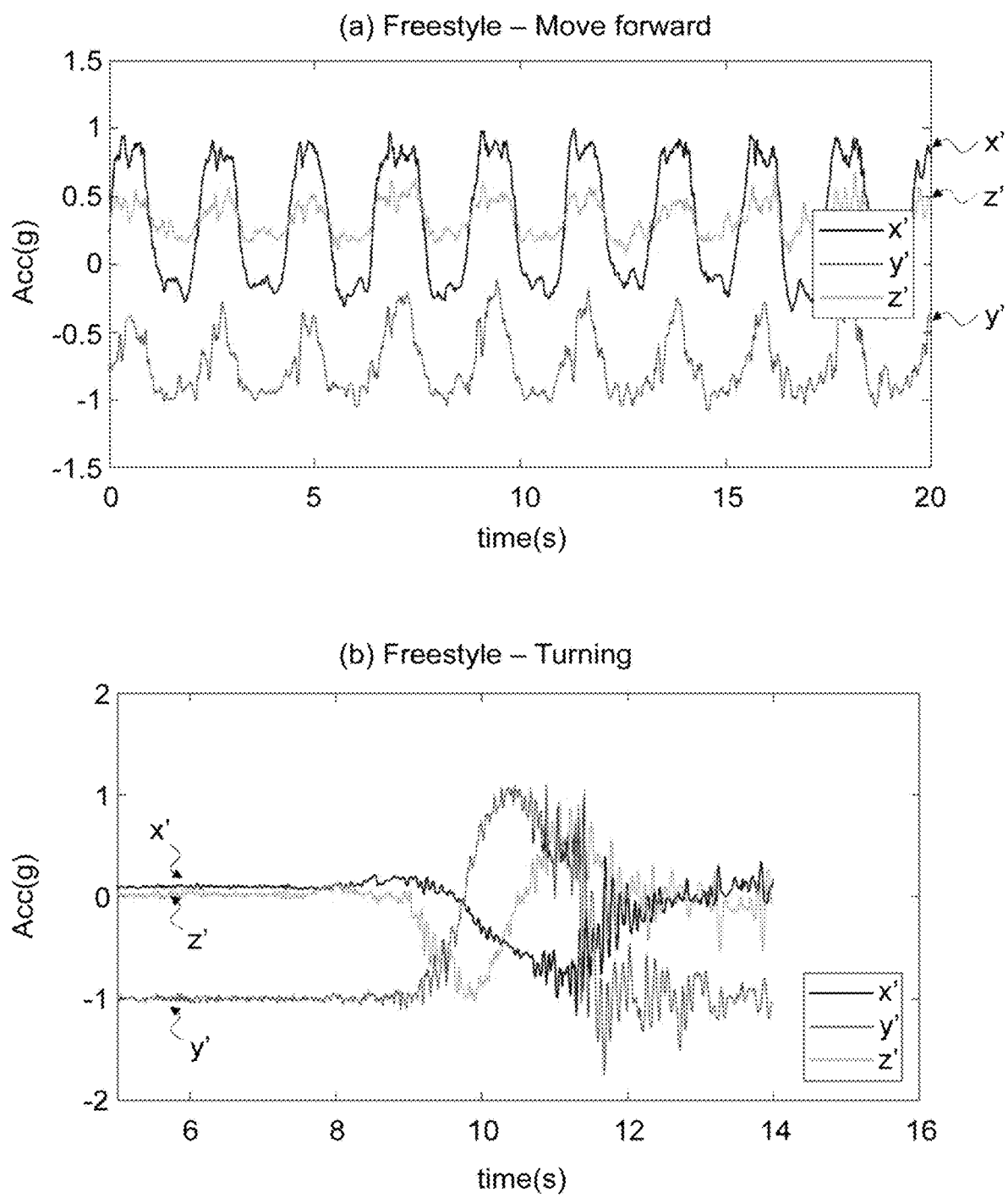
FIG. 9 is a view showing an example of an acceleration graph with respect to time of an exercise posture (freestyle) in the case of swimming according to a first embodiment of the present invention.

FIG. 9 is a view showing an example of an acceleration graph with respect to time of an exercise posture (freestyle) in the case of swimming according to a first embodiment of the present invention. The freestyle is a stroke of alternatingly raising and pushing forward both arms in a prone position while kicking, and may be analyzed by dividing the stroke into moving forward and turning as shown in FIG. 9, and a first exercise parameter may be derived and used as exercise information as shown below.

---

Stroke count:
(if x'(n) > 0.5 && x'(n − 1) < 0.5) count = count + 2
Stroke rate: Stroke count/Elapsed time
Turning time point:
(if z' < −0.5 && y' > 0.5 in less than 2 seconds) turn occurs
Lap time: Time elapsed between turning time points
Lap count: Turning count
Exercise distance: Lap count × Lane length information
Calorie consumption: Exercise distance × Calorie consumption coefficient
Stroke distance: Lane length information/Stroke count between turns
Exercise speed: Lane length information/Lap time
Exercise efficiency: Stroke count between turns + Lap time

---

In addition, the exercise parameter extraction module 126 may further extract and provide at least one among vertical oscillation, horizontal oscillation, consistency, breathing time, left-right balance (symmetry), breathing volume, and shock amount on the basis of the extracted first exercise parameter. At this point, the extracted second exercise parameter may be used for posture information and injury risk information of the user during exercise.

---

Vertical oscillation (Vertical moving distance):
Amplitude of corresponding value after integration of up-down direction acceleration (z')
Horizontal oscillation (Horizontal moving distance):
Amplitude of corresponding value after integration of left-right direction acceleration (x')
Consistency: Deviation of lap time + Deviation of stroke rate
Breathing time: Time of x' > 0.7
Left-right balance (symmetry):
Rate of breathing time out of total lap time, and the more it deviates from 0.5, the worse
Breathing volume: Breathing time × Coefficient of breathing volume per hour

---

Figure 10:
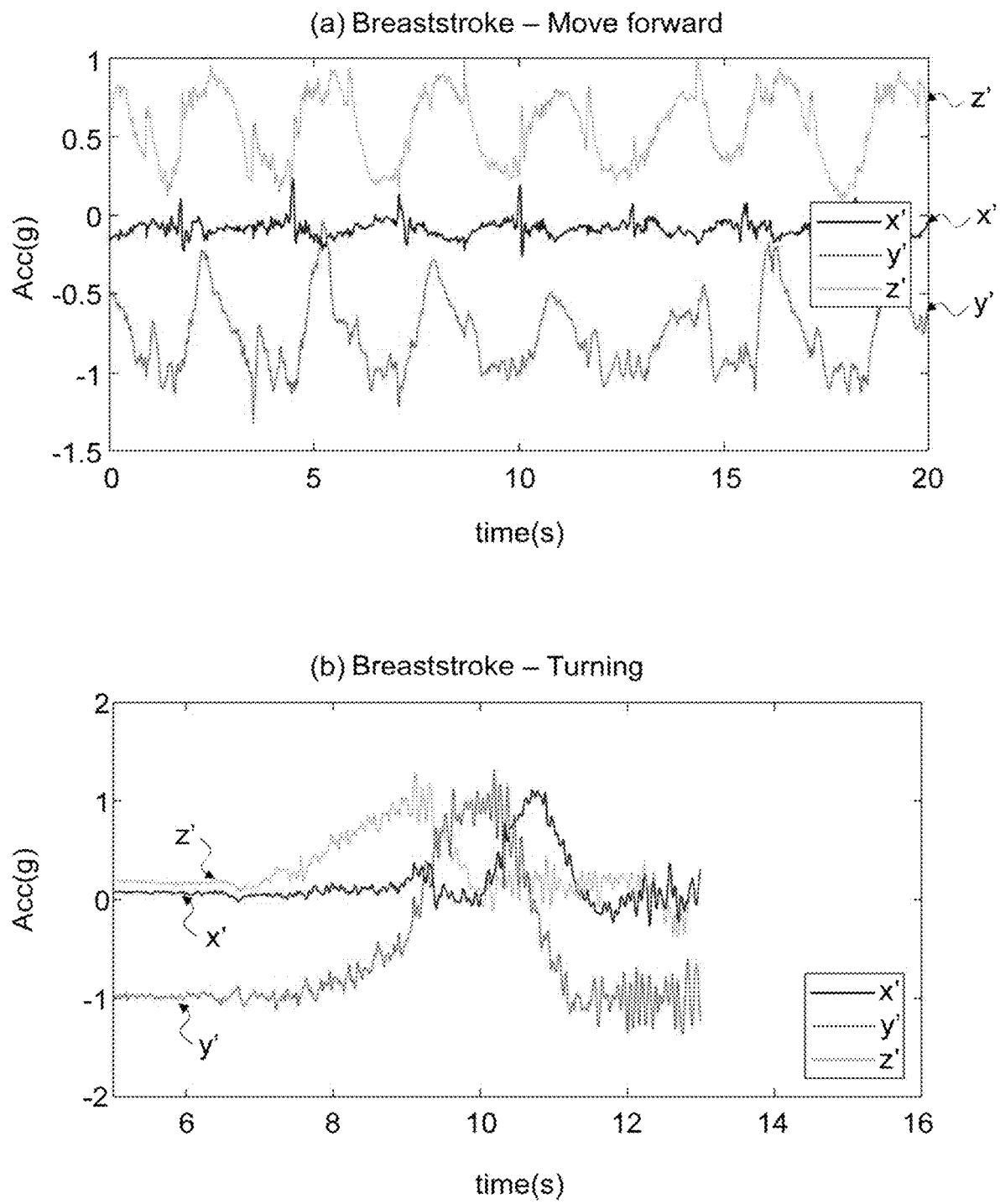
FIG. 10 is a view showing an example of an acceleration graph with respect to time of an exercise posture (breaststroke) in the case of swimming according to a second embodiment of the present invention.

FIG. 10 is a view showing an example of an acceleration graph with respect to time of an exercise posture (breaststroke) in the case of swimming according to a second embodiment of the present invention. The breaststroke is a stroke of folding both arms and legs at the same time and stretching the arms forward and the legs backwards, and may be analyzed by dividing the stroke into moving forward and turning as shown in FIG. 10, and a first exercise parameter may be derived and used as exercise information as shown below.

---

Stroke count:
(if z'(n) > 0.5 && z'(n − 1) < 0.5) count = count + 1
Stroke rate: Stroke count/Elapsed time
Turning time point:
(if y' > 0.5 && |x'| > 0.5 in less than 2 seconds) turn occurs
Lap time: Time elapsed between turning time points
Lap count: Turning count
Distance: Lap count × Lane length information
Calorie consumption: Distance × Calorie consumption coefficient
Stroke distance: Lane length information/Stroke count between turns
Speed: Lane length information/Lap time
Swolf: Stroke count between turns + Lap time

---

In addition, the second exercise parameter extracted based on the first exercise parameter is as shown below.

---

Vertical oscillation (Vertical moving distance):
Amplitude of corresponding value after integration of up-down direction acceleration (z')
Horizontal oscillation (Horizontal moving distance):
Amplitude of corresponding value after integration of left-right direction acceleration (x')
Consistency: Deviation of lap time + Deviation of stroke rate
Breathing time: Time of z' > 0.7
Breathing volume: Breathing time × Coefficient of breathing volume per hour

---

Figure 11:
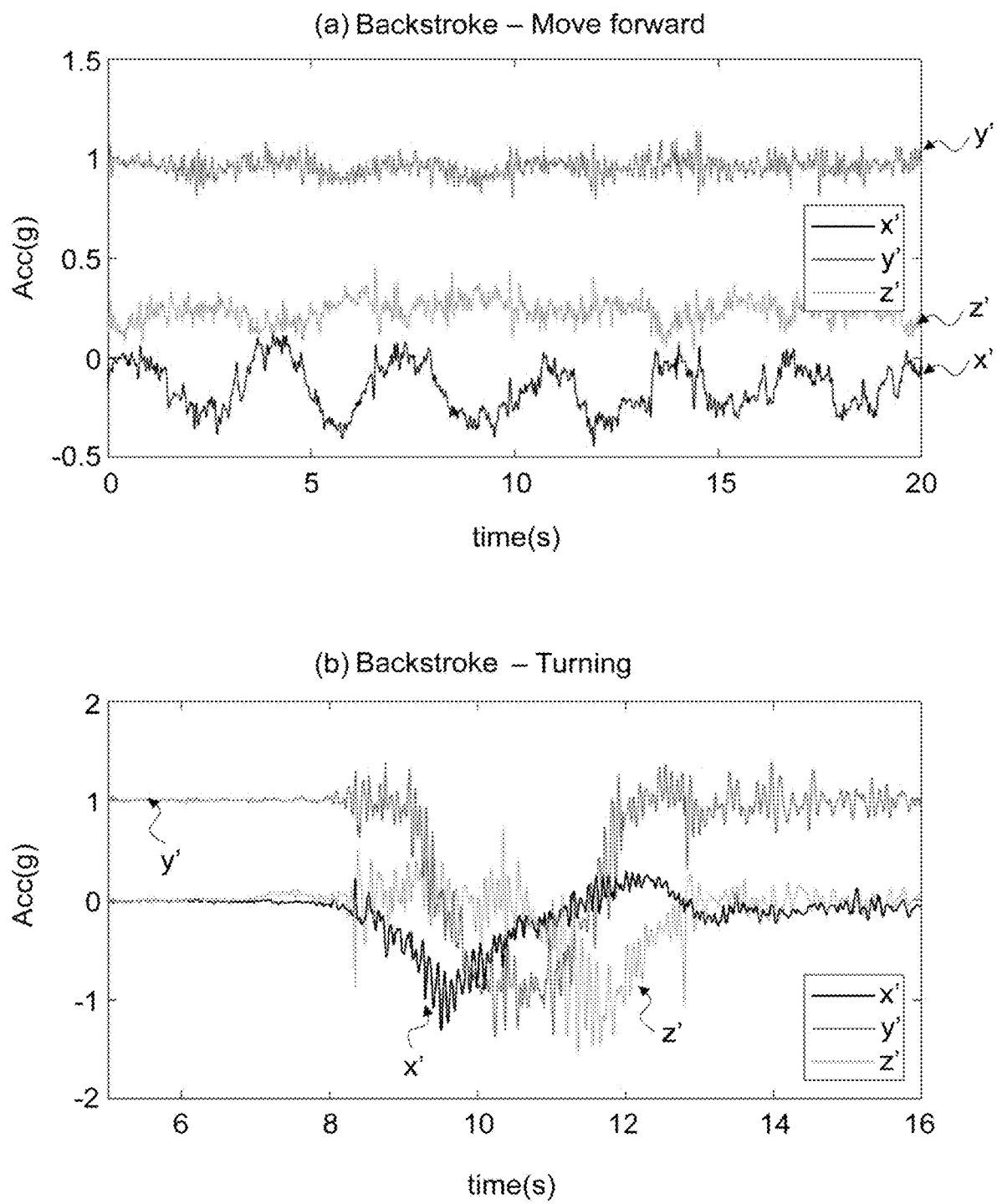
FIG. 11 is a view showing an example of an acceleration graph with respect to time of an exercise posture (backstroke) in the case of swimming according to a third embodiment of the present invention.

FIG. 11 is a view showing an example of an acceleration graph with respect to time of an exercise posture (backstroke) in the case of swimming according to a third embodiment of the present invention. The backstroke is a stroke of alternatingly pushing forward both arms making circles in a supine position while kicking with the feet, and may be analyzed by dividing the stroke into moving forward and turning as shown in FIG. 11, and a first exercise parameter may be derived and used as exercise information as shown below.

---

Stroke count:
(if x'(n) > 0 && x'(n − 1) < 0) count = count + 2
Stroke rate: Stroke count/Elapsed time
Turning time point: (if y' < −0.5) turn occurs
Lap time: Time elapsed between turning time points
Lap count: Turning count
Distance: Lap count × Lane length information
Calorie consumption: Distance × Calorie consumption coefficient
Stroke distance: Lane length information/Stroke count between turns
Speed: Lane length information/Lap time
Swolf: Stroke count between turns + Lap time

---

In addition, the second exercise parameter extracted based on the first exercise parameter is as shown below.

---

Vertical oscillation (Vertical moving distance):
Amplitude of corresponding value after integration of up-down direction acceleration (z')
Horizontal oscillation (Horizontal moving distance):
Amplitude of corresponding value after integration of left-right direction acceleration (x')
Consistency: Deviation of lap time + Deviation of stroke rate
Symmetry: (within 2 stroke range) |Maximum value + Minimum value| of x (the more it deviates from 0, the worse)

---

Figure 12:
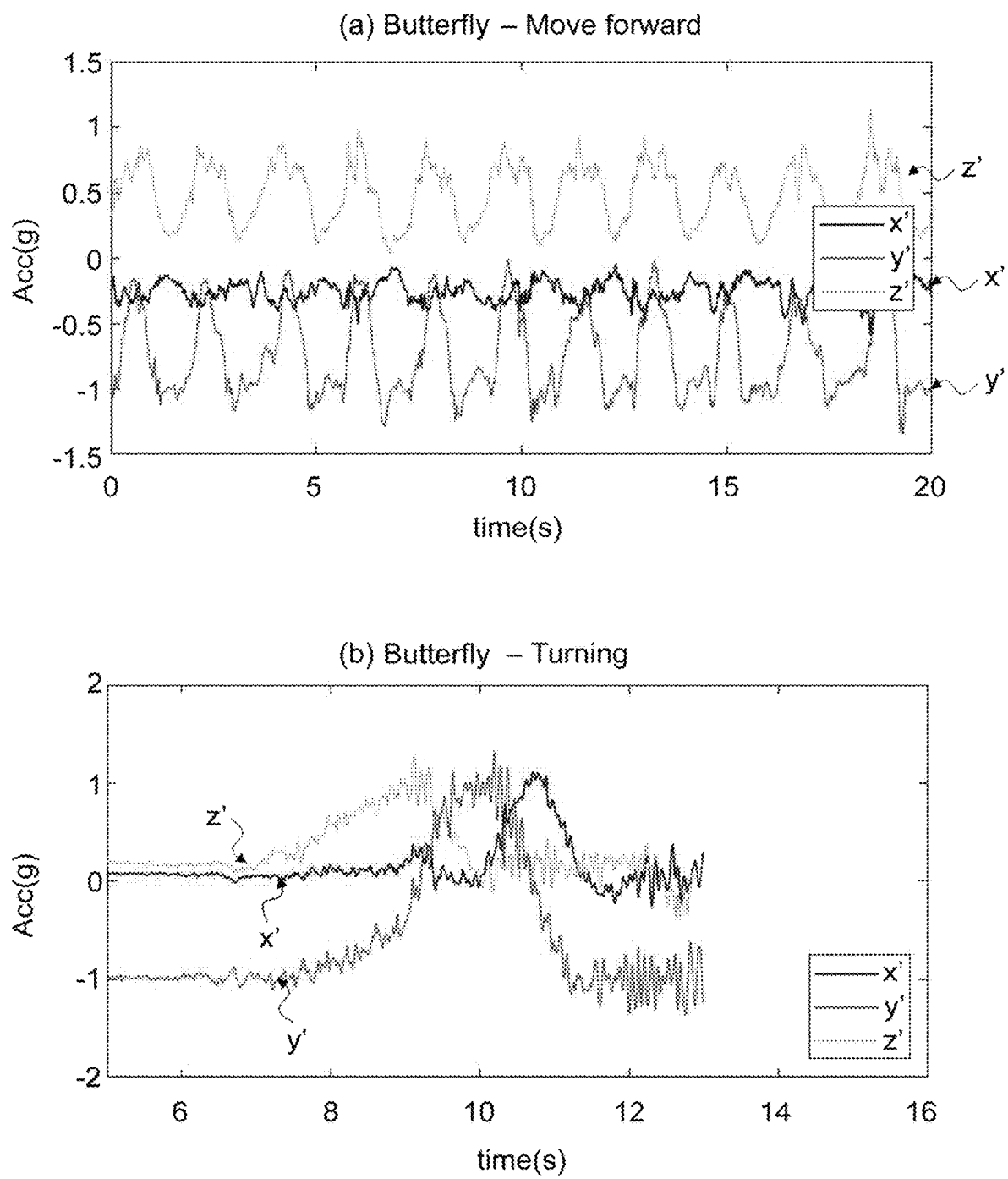
FIG. 12 is a view showing an example of an acceleration graph with respect to time of an exercise posture (butterfly) in the case of swimming according to a third embodiment of the present invention.

FIG. 12 is a view showing an example of an acceleration graph with respect to time of an exercise posture (butterfly) in the case of swimming according to a third embodiment of the present invention. The butterfly is a stroke of stretching two arms out of water making a circle while simultaneously kicking up and down with two legs, and may be analyzed by dividing the stroke into moving forward and turning as shown in FIG. 12, and a first exercise parameter may be derived and used as exercise information as shown below.

---

Stroke count:
(if z'(n) > 0.5 && z'(n − 1) < 0.5) count = count + 1
Stroke rate: Stroke count/Elapsed time
Turning time point:
(if y' > 0.5 && |x'| > 0.5 in less than 2 seconds) turn occurs
Lap time: Time elapsed between turning time points
Lap count: Turning count
Distance: Lap count × Lane length information
Calorie consumption: Distance × Calorie consumption coefficient
Stroke distance: Lane length information/Stroke count between turns
Speed: Lane length information/Lap time
Swolf: Stroke count between turns + Lap time

---

In addition, the second exercise parameter extracted based on the first exercise parameter is as shown below.

---

Vertical oscillation (Vertical moving distance):
Amplitude of corresponding value after integration of up-down direction acceleration (z')
Horizontal oscillation (Horizontal moving distance):
Amplitude of corresponding value after integration of left-right direction acceleration (x')
Consistency: Deviation of lap time + Deviation of stroke rate
Breathing time: Time of z' > 0.5 (arbitrary)
Breathing volume: Breathing time × Coefficient of breathing volume per hour
Shock: Maximum rate of change of acceleration vector

---

Figure 13:
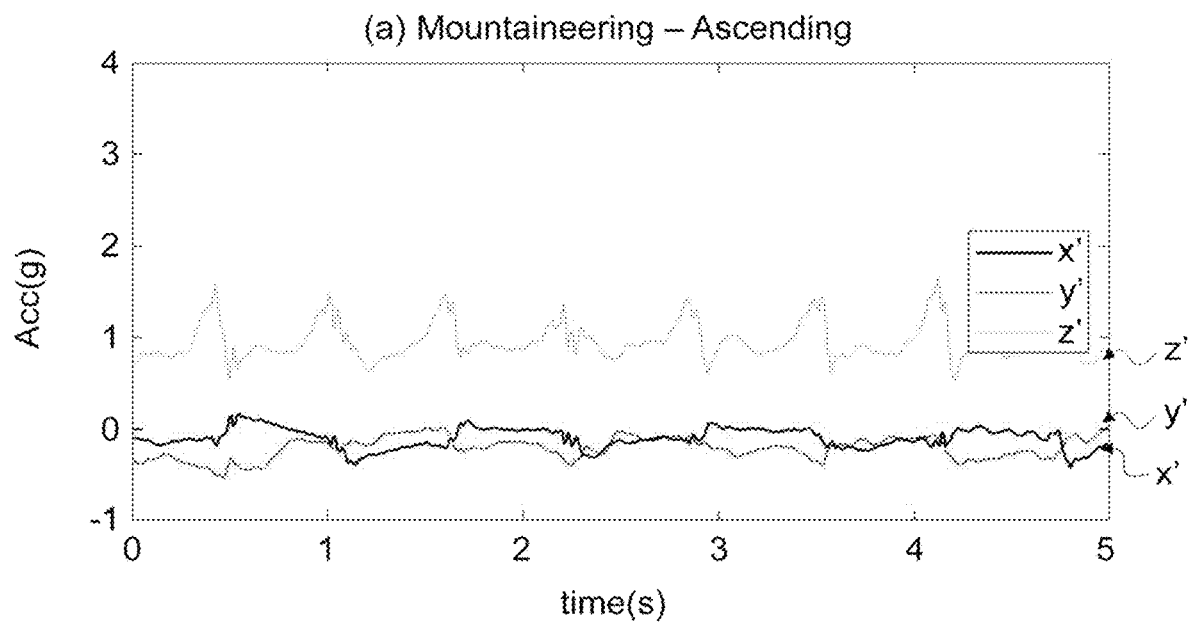
FIG. 13 is a view showing an example of an acceleration graph with respect to time of an exercise posture in the case of mountaineering according to a fourth embodiment of the present invention.
Figure 13:
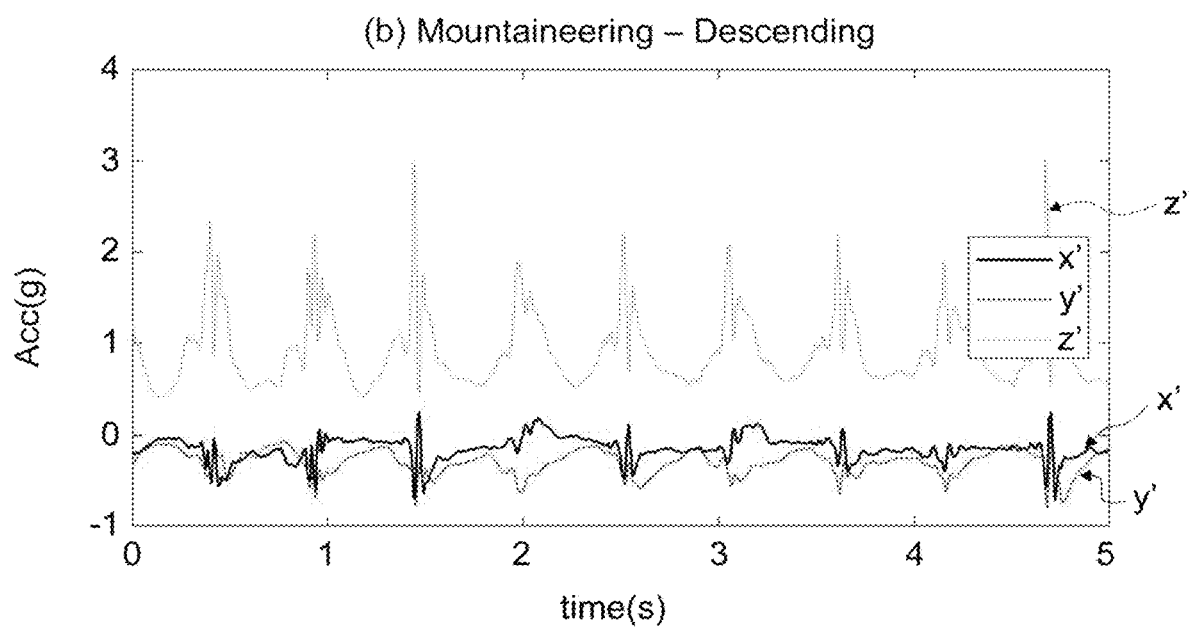

Meanwhile, FIG. 13 is a view showing an example of an acceleration graph with respect to time of an exercise posture in the case of mountaineering according to a fourth embodiment of the present invention. In the case of the mountaineering exercise, the exercise posture determination module 125 may determine the exercise posture as an ascending posture of the mountaineering exercise when the average value of the up-down direction acceleration measured in the most recent preset time period (e.g., 5 seconds) based on the current time point is greater than a preset value, and as a descending posture of the mountaineering exercise when the average value is smaller than or equal to the preset value as shown in FIG. 13. At this point, the preset value may be 0.98(g).

In addition, the exercise parameter extraction module 126 may derive exercise parameters by analyzing accelerations with respect to time as shown in FIG. 13 during the mountaineering exercise.

Specifically, the exercise parameter detection module 125 may derive exercise parameters during mountaineering by setting a walking time when starting mountaineering, extracting a peak value of vertical direction acceleration within a walking cycle including a stance phase and a swing phase, detecting the walking time by detecting the start point and the end point of double limb stance based on the peak value, and distinguishing left steps and right steps while walking by separating double limb stance and single limb stance. A specific technique of detecting walker factors related thereto is disclosed in Korean Patent Registration No. 10-2304300 of the present applicant. However, although a geomagnetic sensor is used together in Korea Patent Registration No. 10-2304300, it can be implemented using only an accelerometer in the present invention.

In addition, it is possible to detect a walking jerk signal, which is a time point when a shock is applied to the ground at the moment when a single limb stance is switched to a double limb stance, by differentiating the vertical direction acceleration, and within a set window, set the peak value of the walking jerk signal located before the peak value of the vertical direction acceleration as the start point of the double limb stance, and set the peak value of the walking jerk signal located after the peak value of the vertical direction acceleration as the end point of the double limb stance.

In addition, various exercise parameters can be derived by distinguishing left steps and right steps of a walker according to the sign of the horizontal direction acceleration corresponding to the lowest peak of the vertical direction acceleration during mountaineering.

That is, the exercise parameter extraction module 126 may extract at least one among step count, step rate (step count/elapsed time), shock amount, left-right balance (symmetry), consistency, horizontal oscillation, maximum load, exercise distance, exercise speed (distance/total elapsed time), maximum exercise speed, lap time (target distance completion time), step length (exercise distance/step count), and calorie consumption (exercise distance x calorie consumption coefficient) as an exercise parameter.

Figure 14:
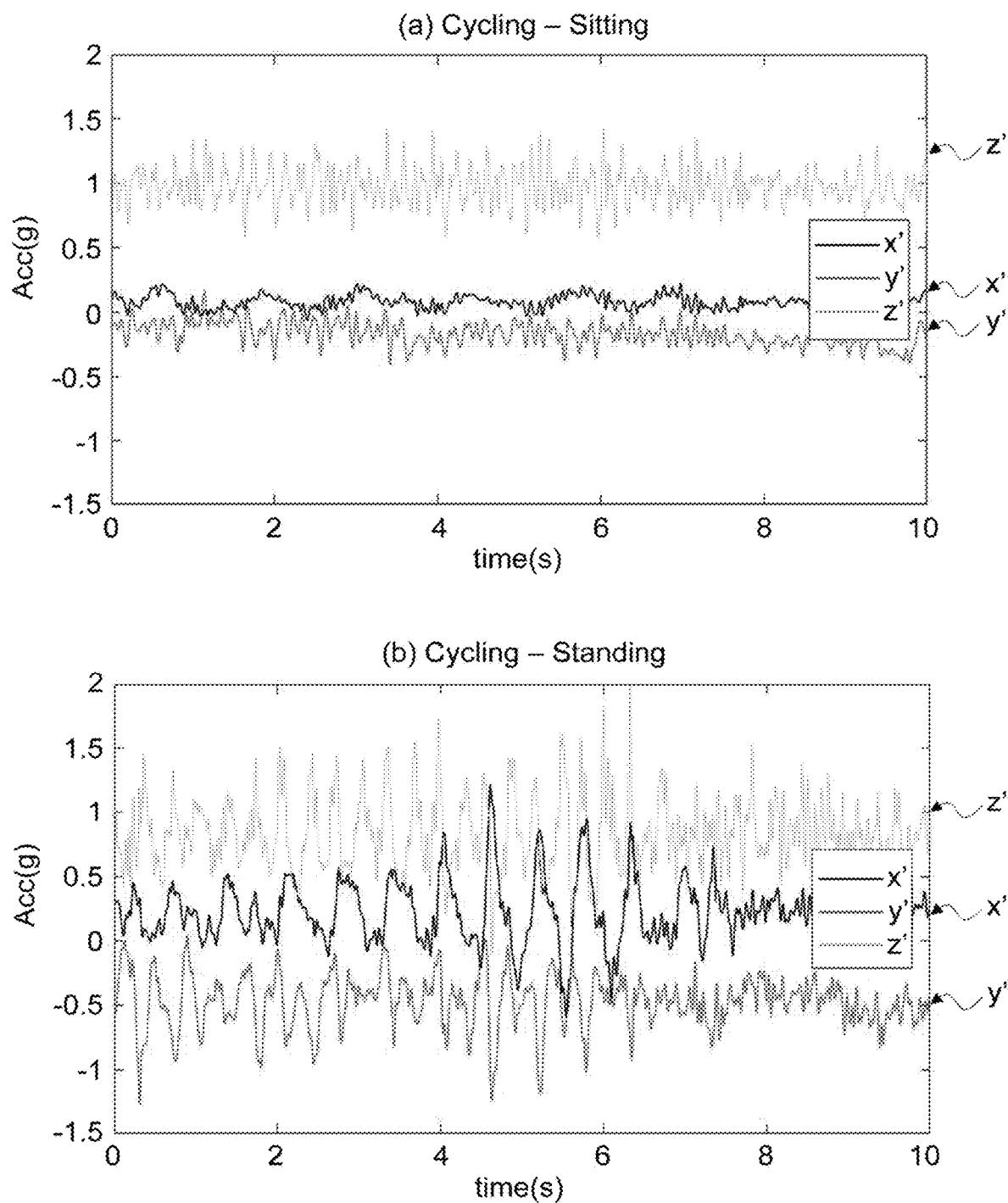
FIG. 14 is a view showing an example of an acceleration graph with respect to time of an exercise posture in the case of cycling exercise according to a fifth embodiment of the present invention.

Meanwhile, FIG. 14 is a view showing an example of an acceleration graph with respect to time of an exercise posture in the case of cycling exercise according to a fifth embodiment of the present invention. In the case of the cycling exercise, the exercise posture determination module 125 may determine the exercise as a standing posture of the cycling exercise when the vertical oscillation obtained by integrating twice the measured up-down direction acceleration is greater than a preset value, and as a sitting posture of the cycling exercise when the vertical oscillation is smaller than the preset value as shown in FIG. 14.

Figure 15:
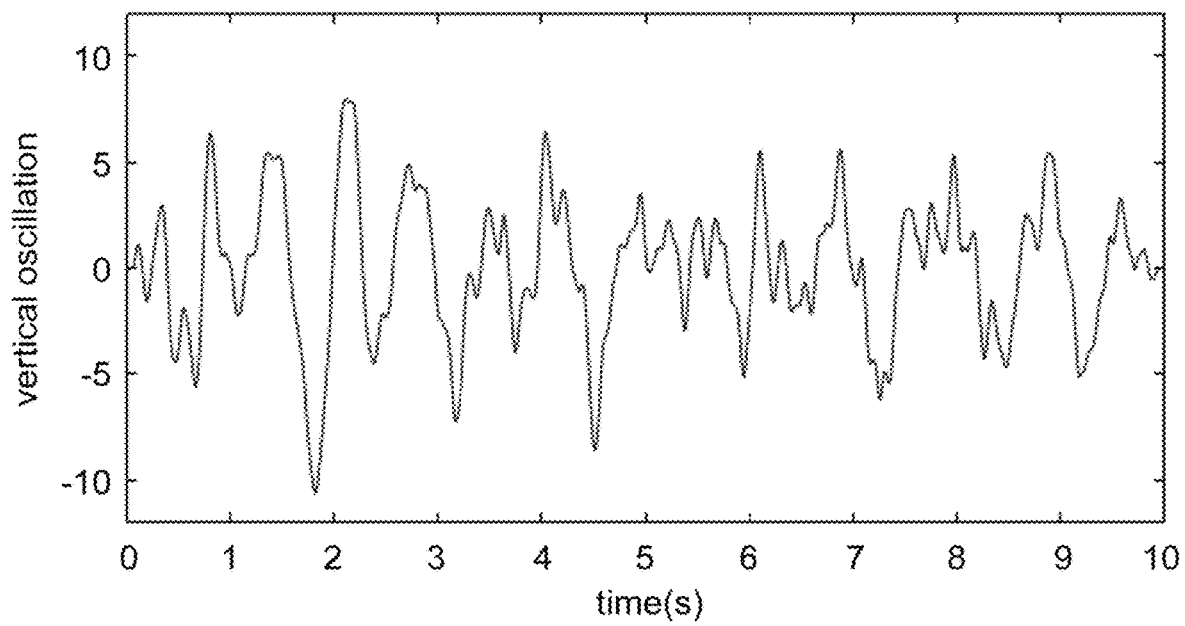
FIG. 15 is a view showing an example of a vertical oscillation graph with respect to the up-down direction acceleration z' of FIG. 13.
Figure 15:
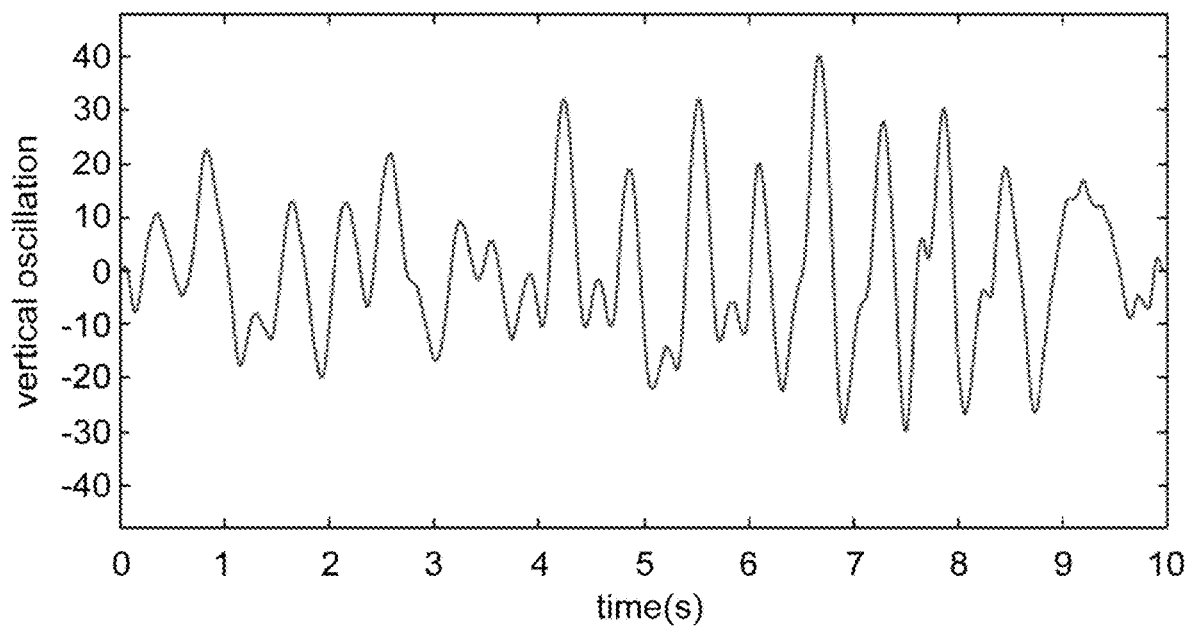

Here, the vertical oscillation graph may be obtained as shown in FIG. 15 by integrating twice the up-down direction oscillation (z') among the acceleration signals of FIG. 14, and at this point, the posture may be classified as a standing posture when the amplitude of the vertical oscillation index exceeds 20, and as a sitting posture when the amplitude of the vertical oscillation index does not exceed 20.

In addition, the exercise parameter extraction module 126 may extract at least one among the stroke count, stroke rate, exercise speed, exercise distance, and calorie consumption as an exercise parameter.

---

Stroke count: (x' at every +peak or −peak) count = count + 1
Stroke rate: Stroke count/Elapsed time
Speed: Stroke count x Gear rate coefficient x Wheel size coefficient
Distance: Integration (Speed)
Calorie consumption: Distance x Calorie consumption coefficient

---

Meanwhile, information on the analysis of exercise postures for each sports exercise may be output through the guide module 140. For example, it is also possible to output the analysis information through a speaker, a cellular phone, a computer, wireless earphones, or the like.

In addition, the guide module 140 may convert the posture analysis information generated by the analysis module 120 into information including sounds or images that can be recognized by the user, and output the converted information. For example, when correction of the user's line of sight is needed before measuring exercise postures, the guide module 140 may output a voice or a guide phrase, such as "Look straight ahead", "Look up", "Look down", through a speaker (earphones) provided in the exercise analysis system or a cellular phone, computer, or wireless earphones connected to the exercise analysis system. Alternatively, when the user does not look straight ahead, a warning sound may be output so that the user may recognize where to fix the gaze only with the warning sound.

Particularly, although it is specified that wireless earphones or a speaker may be included in the guide module 140, since it is essential in the present invention to attach an accelerometer to the earphones worn on the user's head, basically, posture analysis information is directly output to the ears of the user through the exercise analysis system. In addition, the guide module 140 may be realized in various forms to be connected to a smart phone, a computer, a dedicated display or the like so that accurate correction information may be output as an image.

In addition, the exercise analysis system may transmit the exercise posture analysis information of the sports exercise derived by the analysis module 120 to be stored in the database 130. At this point, as the exercise posture analysis information is accumulatively stored, the user's exercise postures may be confirmed according to change of time while a user is doing a sports exercise. Therefore, when a large amount of exercise posture analysis information is accumulated and stored, this data may be utilized as big data and used for various statistics and analyses.

Conventionally, although postures are analyzed using inertial measurement units (IMU) such as an accelerometer and a gyroscope at the same time, there is a limit in measuring angular velocity and acceleration of a part to which a sensor is attached and processing the signals to express movement. Accordingly, there is a difficulty in accurately analyzing exercise postures for each exercise while a user is doing a sports exercise.

For example, in the case of 3-axis acceleration, the direction of collecting the acceleration is determined according to the location and direction of attaching a sensor, and this has a problem in that it is difficult to grasp the up-down, left-right, and front-rear directions due to the difference in the attachment method for each user or the structure of human body. In addition, in the case of a 6-axis accelerometer (3-axis accelerometer+gyroscope), although the up-down direction can be distinguished through the use of a gyroscope, there is a problem in that it is difficult to grasp the left-right and front-rear directions of the user. In addition, in the case of 9-axis acceleration, although the up-down direction may be distinguished since acceleration information may be collected separately in the directions of up-down, north-south, and east-west, there is still a problem in that it is difficult to collect the left-right and front-rear accelerations of a human body.

In addition, in the case where the accelerometer is attached to the head like earphones, since the shape of a person's head or ears is different, when the accelerometer is attached to the head, particularly, when the earphones are worn on the ears, the axis of the sensor changes greatly for each person. Therefore, when the earphones are worn on the ears, the direction cannot be distinguished with the existing technique.

In addition, in the prior art, as a gyroscope and an accelerometer are used simultaneously, a lot of power is consumed, so that it is difficult to commercialize by applying them to the parts of earphones or headsets.

In addition, since all of the existing IMUs may measure only the angular displacement when the head is bowed or tilted back, there is a limitation in that an angle value cannot be derived.

As described above, the conventional measurement method has a disadvantage in that it is difficult to collect accelerations by identifying the user's up and down, left and right, or front and rear directions using only an accelerometer.

On the contrary, the applicant of the present invention has discovered through experiments that user's postures can be analyzed by attaching only an accelerometer to the head without using a force plate.

In addition, since the present invention may collect and analyze acceleration signals of the user's up and down, left and right, or front and rear directions using only an accelerometer attached to the head, user's postures can be accurately analyzed while significantly reducing power consumption.

In addition, the present invention may provide meaningful feedback to the user by classifying exercise postures and deriving exercise parameters through exercise posture analysis of each exercise.

Although the embodiments of the present invention have been described in more detail with reference to the accompanying drawings, the present invention is not necessarily limited to these embodiments, and various modifications may be made within the scope without departing from the technical spirit of the present invention. Therefore, the embodiments disclosed in the present invention are not intended to limit, but to explain the technical spirit of the present invention, and the scope of the technical spirit of the present invention is not limited by these embodiments. Therefore, it should be understood that the embodiments described above are illustrative and not restrictive in all respects. The protection scope of the present invention should be interpreted by the following claims, and all technical spirits within the scope equivalent thereto should be construed as being included in the scope of the present invention.

DESCRIPTION OF SYMBOLS

110: measurement module
111: Sensor module
112: Sensor control module
113, 128: Communication module
120: Analysis module
121: Acceleration collection module
122: Gravity vector detection module
123: Direction axis calculation module
124: Calibration module
125: Exercise posture determination module
126: Exercise parameter extraction module
127: Analysis control module
129: User interface module
130: Database
140: Guide module

What is claimed is:

1. An exercise analysis system comprising:
a sensor configured to sense movement and posture of a user and consisting of at least one accelerometer configured to be worn on the user's head; and
circuitry configured to:
measure an acceleration signal according to movement of the head solely using the at least one accelerometer; and
calculate 3-axis directional axes by collecting a first acceleration corresponding to a viewpoint of the user gazing at the front and a second acceleration corresponding to a viewpoint of the user gazing at an angle other than the front, and analyze exercise parameters for each exercise posture according to an exercise type by correcting the measured acceleration signal while the user is exercising into an acceleration signal of a user coordinate system,
wherein the circuitry is further configured to:
collect the first acceleration corresponding to the viewpoint of the user gazing at the front and the second acceleration corresponding to the viewpoint of the user gazing at an angle other than the front from the measured acceleration signal;
measure a first gravity vector and a second gravity vector corresponding to the viewpoints at which the first acceleration and the second acceleration are collected when indexes of variation of the first acceleration and the second acceleration satisfy a predetermined condition; and
calculate a left-right direction vector and a front-rear direction vector by performing an outer product on the first gravity vector and the second gravity vector,
classify exercise postures by determining whether a left-right direction acceleration (x'), a front-rear direction acceleration (y'), and an up-down direction acceleration (z') corrected into the acceleration signal of the user coordinate system satisfy a preset condition,
wherein, when the user is gazing at the front, the circuitry is configured to calculate a left-right direction vector of a left-right axis (ML, Medial-Lateral axis) by performing an outer product on the first gravity vector and the second gravity vector and then to calculate a front-rear direction vector of a front-rear axis (AP, Antero-Posterior axis) by performing an outer product on the first gravity vector and the left-right direction vector,
wherein, when the user is gazing at an angle other than the front, the circuitry is configured to calculate the front-rear direction vector of the front-rear axis by performing an outer product on the first gravity vector and the second gravity vector and then to calculate the left-right direction vector of the left-right axis by performing an outer product on the first gravity vector and the front-rear direction vector, and
wherein, when the exercise type is cycling, the circuitry is configured to use only the measured up-down direction acceleration, and the circuitry is configured to determine the exercise posture as a standing posture of the cycling exercise when the vertical oscillation obtained by integrating twice the measured up-down direction acceleration is greater than a preset value and as a sitting posture of the cycling exercise when the vertical oscillation is smaller than the preset value.

2. The system according to claim 1, wherein the circuitry is configured to extract exercise parameters for the determined exercise posture, and the exercise parameters include at least one among pedal stroke count, pedal stroke rate, exercise speed, exercise distance, and calorie consumption.

3. The system according to claim 1, wherein the circuitry is configured to calculate a calibration matrix R based on an up-down direction vector (the first gravity vector), the left-right direction vector, and the front-rear direction vector, and the calibration matrix is calculated by the following equation using user coordinates of the user measured by the at least one accelerometer and raw values of sensor coordinates:

$$X\text{cal} = R \times X\text{raw}$$

wherein Xcal denotes sensor values $((u_x, u_y, u_z), (v_x, v_y, v_z), (w_x, w_y, w_z))$ of the user coordinates for an up-down axis, a left-right axis, and a front-rear axis, in which $(u_x, u_y, u_z)$ is an up-down direction acceleration (z'), $(v_x, v_y, v_z)$ is a left-right direction acceleration (x'), $(w_x, w_y, w_z)$ is a front-rear direction acceleration (y'), and Xraw denotes raw values (x, y, z) of the sensor coordinates, in which R is a calibration matrix $$R = \begin{bmatrix} u_x & u_y & u_z \\ v_x & v_y & v_z \\ w_x & w_y & w_z \end{bmatrix}$$

configured based on the up-down direction vector (u), left-right direction vector (v), and front-rear direction vector (w).

* * * * *